United States Patent Office 2,994,704
Patented Aug. 1, 1961

2,994,704
PREPARATION OF CYCLIC ALKYLENE CARBONATES
Gifford W. Crosby, River Forest, and Allen F. Millikan, Crystal Lake, Ill., assignors to The Pure Oil Company, Chicago, Ill., a corporation of Ohio
No Drawing. Filed Nov. 19, 1958, Ser. No. 774,825
9 Claims. (Cl. 260—340.2)

This invention relates to an improved process for the production of alkylene carbonates by the reaction of oxirane compounds such as alkylene oxides, including ethylene and propylene oxides, for example, with carbon dioxide at elevated temperatures and pressures. More particularly, this invention relates to processes for the production of alkylene carbonates from oxirane compounds wherein a catalyst is employed for promoting the reaction.

Ethylene carbonate has been prepared from ethylene glycol by reaction with phosgene. The reaction of alcohols with phosgene produces the corresponding alkyl carbonate. Also, ethylene chlorohydrin, when reacted with alkali metal carbonates or bicarbonates, produces ethylene carbonate. Several research workers have suggested catalysts for the reaction of oxirane compounds with carbon dioxide. Such catalysts as sodium hydroxide on activated carbon, pyridine, and amines have been included in this work. These prior art methods are deficient for a number of reasons, including the danger of explosions, poor yields, or contaminated products.

It is an object of the invention to provide a catalytic process for producing alkylene carbonates by the reaction of oxirane compounds with carbon dioxide wherein the reaction is facilitated, product purity is improved, and yields are increased.

It is another object of this invention to provide a process for the preparation of alkylene carbonates from oxirane compounds by catalytic reaction with carbon dioxide in the presence of organic sulfonium compounds.

A further object of this invention is to provide a process for the production of alkylene carbonates from alkylene oxides through reaction with carbon dioxide in the presence of organic sulfonium salts using a small amount of said catalyst.

Other objects and features of this invention will be apparent from the following description.

In accordance with this invention, the alkylene oxides which are reacted with carbon dioxide are those of the oxirane system, and have the general structural formula,

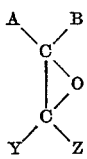

in which A, B, Y and Z represent hydrogen or hydrocarbon groups containing up to 20 carbon atoms, and in which any two of the groups A, B, Y and Z may be interconnected to form, with one or two of the carbon atoms shown in the formula, a carbocyclic ring. The reaction with carbon dioxide may be shown as follows:

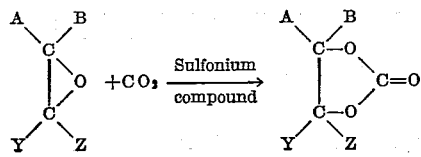

The organic sulfonium compound or sulfonium salt used as a catalyst has the general formula,

wherein R, R' and R" are the same or different hydrocarbon radicals containing up to 20 carbon atoms, and X is a halogen of the group of iodine, bromine, or chlorine.

Suitable oxirane compounds to be used as the beginning reactant of this invention include ethylene oxide, cyclohexylethylene oxide, propylene oxide, 1,2-epoxybutane, 2,3-epoxybutane, 1,2-epoxyhexane, epoxyisobutylene, 1,2-epoxyhexadecane, cyclohexene oxide, methylenecyclohexane oxide, cycloheptene oxide, styrene oxide, cyclopentene oxide, and similar compounds containing the oxirane ring.

Specific examples of catalysts for the reaction comprise the class of sulfonium salts coming under the above formula, and include trimethylsulfonium bromide, trimethylsulfonium chloride, trimethylsulfonium iodide, triethylsulfonium iodide, triethylsulfonium bromide, triethylsulfonium chloride, diethylmethylsulfonium bromide, diethylmethylsulfonium chloride, diethylmethylsulfonium iodide, tolyldimethylsulfonium bromide, tolyldimethylsulfonium chloride, triphenylsulfonium bromide and tolyldimethylsulfonium iodide. These sulfonium salts are crystalline solids or viscous oils at room temperatures and can be prepared by the alkylation of sulfides, or by other methods known in the art. We have found that hexacovalent sulfur compounds, such as alkali metal sulfonates, do not catalyze this reaction.

The amount of catalyst required to carry out the process of this invention depends somewhat on the reaction conditions, but is usually within the limits of about 0.001 to 10% by weight, based on the amount of oxirane reactant. The catalyst concentration will vary as different temperatures, catalysts, contact times and pressure are used. Also, the solubility of the catalyst in any diluent or carrier for the reaction may vary. The catalyst may be dissolved in the oxirane reactant, or in a diluent, or it may be placed directly in the reaction zone by suitable means for controlling the amount added. In certain instances it is undesirable to contact the catalyst with the oxirane compound in the absence of the carbon dioxide because this tends to promote side reactions and decreased yields of the desired glycol carbonates or alkylene carbonates.

This is a type of reaction wherein an induction period is experienced in starting the reaction, particularly in the absence of a diluent, and this characteristic may require the use of more catalyst. Induction periods may be reduced by adding to the reactant mass a small amount of the glycol carbonate product.

The reaction is carried out at a temperature of about 212° F. to 500° F., preferably from about 300° to 450° F., under a pressure of about 100 p.s.i.g. to 1000, or as high as 3000 p.s.i.g. The reaction may be conducted either batchwise or continuously and in the presence or absence of an inert diluent. The catalyst may be continuously introduced in solution form, along with the carbon dioxide and oxirane compound under the desired reaction conditions, into an elongated reaction zone. Preferred diluents or solvents for the reaction include dioxane, benzene, or crude glycol carbonates. In using a batchwise operation, portions of the oxirane compounds and the catalyst are introduced into a pressure-type reactor, carbon dioxide is introduced in amounts sufficient to build up the desired pressure, and the reaction mixture is agitated during the application of heat to the reaction vessel.

These conditions are maintained by the introduction of the carbon dioxide under pressure until the reaction is completed. In general, the reaction is completed in about ½ hour to 5 hours.

The proportions of oxirane compound and carbon dioxide are generally adjusted so as to provide an excess of carbon dioxide over the stoichiometric amount thereof required to react with all of the oxirane compound. The excess of carbon dioxide will, in general, vary from about 1% to 300%. In any event, it is necessary to avoid using an excess of oxirane compound, since these compounds tend to polymerize under pressure and may create an explosion hazard.

The invention is illustrated by the following specific examples:

*Example I*

About 0.18 g. of triethylsulfonium iodide and 17.6 g. of ethylene oxide were chilled to −20° F., and charged to an autoclave of 100 ml. volume, which then was charged with $CO_2$ until the pressure rose to 450 p.s.i.g., with agitation by rocking. Heat was applied at a rate which brought the temperature to 430° F. in 1.5 hours. This temperature was maintained for four hours, and the autoclave was rocked throughout the period. At the end of this time, the pressure was about 1000 p.s.i.g. The yield of crude crystalline product was 31.4 g., or 92% based on the ethylene oxide charged. The crude product was recrystallized from toluene to give a refined product with a M.P. of 97—99° F. The literature value for the M.P. of pure ethylene carbonate is 102° F.

*Example II*

About 0.18 g. of trimethylsulfonium iodide and 17.6 g. of ethylene oxide are chilled to about −25° F. and transferred to an autoclave of 100 ml. capacity. Carbon dioxide is charged to the autoclave until the pressure rises to about 450 p.s.i.g. Agitation is applied by rocking the autoclave and the mixture is heated to about 430° F. in 1.5 hours. This temperature is maintained for about 4 hours, and the autoclave is rocked throughout this period. The pressure is about 1000 p.s.i.g. at the end of the reaction period. The yield of crude crystalline product is about 30.0 g., or over 90% based on the ethylene oxide charged.

*Example III*

About 0.18 g. of trimethylsulfonium chloride and 17.6 g. of ethylene oxide are chilled to about −25° F. and charged to an autoclave of 100 ml. capacity. Then $CO_2$ is added until the pressure reaches about 450 p.s.i.g. Agitation is applied by rocking the autoclave and the mixture is heated to about 430° F. in 1.5 hours. This temperature is maintained for about 4 hours, and the autoclave is rocked throughout this period. The pressure is about 1000 p.s.i.g. at the end of the reaction period. The yield of crude crystalline product is about 30.0 g., or over 90% based on the ethylene oxide charged.

*Example IV*

About 0.18 g. of triethylsulfonium bromide and 17.6 g. of ethylene oxide are chilled to about −25° F. and charged to an autoclave of 100 ml. capacity. Carbon dioxide is introduced until the pressure rises to about 450 p.s.i.g. Agitation is applied by rocking the autoclave and the mixture is heated to about 430° F. in 1.5 hours. This temperature is maintained for about 4 hours, and the autoclave is rocked throughout this period. The pressure is about 1000 p.s.i.g. at the end of the reaction period. The yield of crude crystalline product is about 30.0 g., or over 90% based on the ethylene oxide charged.

*Example V*

About 0.18 g. of diethylmethylsulfonium chloride and 17.6 g. of ethylene oxide are chilled to about −25° F. and charged to an autoclave of 100 ml. capacity. Carbon dioxide is introduced until the pressure reaches about 450 p.s.i.g. Agitation is applied by rocking the autoclave and the mixture is heated to about 450° F. in 1.5 hours. This temperature is maintained for about 4 hours, and the autoclave is rocked throughout this period. The pressure is about 1000 p.s.i.g. at the end of the reaction period. The yield of crude crystalline product is about 33 g., or over 94% based on the ethylene oxide charged.

*Example VI*

The reaction described in Example I was carried out without using a sulfonium catalyst. The yield of ethylene carbonate was only 1%.

*Example VII*

About 17.4 g. of ethylene oxide (chilled to −20° F.) and 0.18 g. of triphenylsulfonium bromide were charged to an autoclave of 100 ml. capacity. Carbon dioxide was charged to the autoclave until the pressure reached 490 p.s.i.g., with agitation by rocking. Heat was applied at a rate which brought the temperature of the autoclave to 340° F. in 40 minutes. This temperature was maintained for 4.5 hours, with agitation by rocking throughout the time. At the end of the reaction period, the pressure was approximately 1100 p.s.i.g. There was 33.6 g. of crystalline product, a yield of approximately 94% (based on ethylene oxide charge).

The reaction of this invention to produce cyclic alkylene carbonates or glycol carbonates, or more specifically, ethylene carbonate, or 1,3-dioxolane-2-one, may be carried out with or without a diluent which is non-reactive and aids in temperature control. Such diluents as aromatic hydrocarbons, benzene, crude cyclic alkylene carbonates, or dioxane may be used. The reaction may be conducted in any suitable pressure vessel of the various types known to the art. The reactants may be brought together in any order and it is desirable that an excess of carbon dioxide be used to avoid polymerization of the oxirane compound.

The crude alkylene carbonates obtained may be purified by stripping off any low-boiling compounds. The sulfonium compound may be removed by extraction or precipitation, or the glycol carbonate may be recovered by distillation under reduced pressure.

What is claimed is:

1. The process of producing alkylene carbonates which comprises reacting an alkylene oxide of the oxirane system with carbon dioxide at a temperature of at least about 212° F. and a pressure above about 100 p.s.i.g. in the presence of a catalyst of the formula:

wherein R, R′ and R″ are hydrocarbon radicals containing up to 20 carbon atoms and X is selected from the group consisting of chlorine, bromine, and iodine.

2. The process in accordance with claim 1 in which X is iodine.

3. The process of producing ethylene carbonate which comprises reacting ethylene oxide with carbon dioxide at a temperature of about 212° to 500° F. and a pressure above about 100 p.s.i.g. in the presence of between about 0.001 to 10% by weight based on the weight of said ethylene oxide, of a catalyst of the formula:

wherein R, R′ and R″ are hydrocarbon radicals containing up to 20 carbon atoms, and X is selected from the group of chlorine, bromine, and iodine.

4. The process of producing ethylene carbonate which comprises reacting ethylene oxide with carbon dioxide at a temperature of about 212° to 500° F. and a pressure of above about 100 p.s.i.g. in the presence of catalytic amounts of triethylsulfonium iodide.

5. The process of producing ethylene carbonate which comprises reacting ethylene oxide with carbon dioxide at a temperature of about 212° to 500° F. and a pressure of above about 100 p.s.i.g. in the presence of catalytic amounts of trimethylsulfonium iodide.

6. The process of producing ethylene carbonate which comprises reacting ethylene oxide with carbon dioxide at a temperature of about 212° to 500° F. and a pressure of above about 100 p.s.i.g., in the presence of catalytic amounts of trimethylsulfonium chloride.

7. The process of producing ethylene carbonate which comprises reacting ethylene oxide with carbon dioxide at a temperature of about 212° to 500° F. and a pressure of above about 100 p.s.i.g., in the presence of catalytic amounts of triethylsulfonium bromide.

8. The process of producing ethylene carbonate which comprises reacting ethylene oxide with carbon dioxide at a temperature of about 212° to 500° F. and a pressure of above about 100 p.s.i.g., in the presence of catalytic amounts of diethylmethylsulfonium chloride.

9. The process of producing ethylene carbonate which comprises reacting ethylene oxide with carbon dioxide at a temperature of about 212° to 500° F. and a pressure of above about 100 p.s.i.g., in the presence of catalytic amounts of triphenylsulfonium bromide.

References Cited in the file of this patent

UNITED STATES PATENTS

| | | |
|---|---|---|
| 2,667,497 | Cline | Jan. 26, 1954 |
| 2,766,258 | Malkemus | Oct. 9, 1956 |
| 2,773,007 | Lichtenwalter | Dec. 4, 1956 |
| 2,773,881 | Dunn | Dec. 11, 1956 |
| 2,873,282 | McClellan | Feb. 10, 1959 |

OTHER REFERENCES

Bost: J. Am. Chem. Soc., vol. 62 (1940), pages 1752–4.